(12) United States Patent
Gidney (10) Patent No.: US 12,093,798 B2
(45) Date of Patent: Sep. 17, 2024

(54) DISTRIBUTED MODEL GENERATION VIA INDIRECT PRIVATE DATA ACCESS

(71) Applicant: DocuSign, Inc., San Francisco, CA (US)

(72) Inventor: Kevin Gidney, Oslo (NO)

(73) Assignee: DocuSign, Inc., San Francisco, CA (US)

( * ) Notice: Subject to any disclaimer, the term of this patent is extended or adjusted under 35 U.S.C. 154(b) by 1018 days.

(21) Appl. No.: 17/063,359

(22) Filed: Oct. 5, 2020

(65) Prior Publication Data

US 2022/0108225 A1   Apr. 7, 2022

(51) Int. Cl.
*G06N 20/20* (2019.01)
*G06N 5/04* (2023.01)
*H04L 9/40* (2022.01)

(52) U.S. Cl.
CPC ............... *G06N 20/20* (2019.01); *G06N 5/04* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 6,601,170 B1 * | 7/2003 | Wallace, Jr. | H04L 63/0428 713/168 |
| 11,222,138 B2 * | 1/2022 | Mohassel | A63B 21/222 |
| 2019/0058580 A1 * | 2/2019 | Tormasov | H04L 9/3239 |
| 2020/0143267 A1 * | 5/2020 | Gidney | H04L 9/3239 |
| 2020/0313849 A1 * | 10/2020 | Kar | G06N 3/08 |
| 2021/0209247 A1 * | 7/2021 | Mohassel | A63B 21/023 |
| 2021/0272011 A1 * | 9/2021 | Yonetani | G06N 3/045 |
| 2023/0004868 A1 * | 1/2023 | Gidney | G06Q 20/0855 |

* cited by examiner

*Primary Examiner* — Maikhanh Nguyen
(74) *Attorney, Agent, or Firm* — KDW FIRM PLLC (57) ABSTRACT

A computing system remotely trains a public ensemble model of an artificial intelligence model management system. The system receives, by the model management system, an encrypted representation of a private data value from a client system. The encrypted representation includes annotation information provided by the client system. The system determines, using the encrypted representation and the annotation information, a data value cluster that corresponds to the private data value. Data value clusters are generated using encrypted representations of a private data values provided by client systems. The system obtains, based on the assigned data value cluster, an encrypted representation of a model. The model is trained remotely by the client system using the private data value. The system adds the encrypted representation of the model to the public ensemble model. The public ensemble model is generated using a plurality of encrypted representations of models remotely trained by the client systems.

21 Claims, 6 Drawing Sheets

DISTRIBUTED MODEL GENERATION VIA INDIRECT PRIVATE DATA ACCESS

TECHNICAL FIELD

The disclosure generally relates to the field of computer modeling, and in particular, to training models using private data without directly accessing the private data.

BACKGROUND

The accuracy of machine learning models, such as classification models, can benefit from increased exposure to a disparate set of training data. Furthermore, using trained machine learning models to make predictions on new data can provide insights regarding issues of accuracy for the trained machine learning models. In cases where different parties use machine learning models to perform related tasks, the accuracy of the models used could be improved by shared access to private data or model prediction results. However, different parties with access to disparate sets of private data, or using custom machine learning techniques, may be hesitant to allow their private data or techniques to be used for training models that may be used by other parties.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

Figure (FIG. 1 illustrates a distributed computing environment for a model management system, according to an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Machine learning models may be part of computer artificial intelligence systems used to automate a variety of functions, such as performing automatic clause detection or text classification for documents. Artificial intelligence systems are computer systems which use one or more artificial intelligence-based models (e.g., machine learning models) to make predictions using data. Data usable for model training may be owned by a plurality of different parties (e.g., client systems). Each party may correspond to a customer or client of a learning platform for generating and training models, and may have access to a different set of data usable for training a model. For example, each party may have access to a plurality of contracts containing identified clause examples that can be used by the learning platform for generating and training the model.

New technology initiatives and regulations include a focus on data protection mechanisms (DPM). A DPM may focus on data security, data rights, and/or privacy. Examples of technical DPM include software configurations to encrypt, anonymize and/or disaggregate data from sources. Examples of regulatory DPMs include GDPR (General Data Protection Regulation) and CCPA (California Consumer Privacy Act)). A DPM may make it difficult to train models and artificial intelligence (AI) because of privacy and security concerns that may be associated with information breaches. The principles disclosed can apply to other scenarios in which training models are trained but the underlying data must be kept secure and removable by the party that submitted the data, or may not be otherwise disclosed.

Parties are often only willing to submit information for model generation and training if it can be ensured that their data can be tracked and known at all times, and not exposed to third parties without expressed permission. In addition, each party may need to have the ability to issue a destruction request to remove their data from the system and model, in conformance with right to be forgotten regulations. As such, a system cannot use the data within the training of models unless it can be controlled, tracked, destroyed and obfuscated for personal information or elements.

However, if each party is only able to train a model on information that they have access to and can effectively track and, if required, revoke access to or destroy, the generated model may be over fitted to a small subset of information, limiting the benefits of the automation of information detection. This presents a difficult problem for the training of models for the detection of the widest possible information within the same category.

In order to effectively train a model, the learning platform should have access to as much disparate data as possible. This may be accomplished by using information from many different parties associated with respective client systems to train the model. For example, different parties may have access to information (e.g., clauses) from different verticals and industries that detail the same concept or category, for example indemnity or assignment language, that collectively may form a large set of disparate data that can be used by the system for training the model for classifying the concept or category. By training the model on different sets of data received from different parties, a more comprehensive model can be generated in comparison to models only trained on data from a single party. In some embodiments, the model may be referred to as a "distributed model" due to being trained using a distributed set of data.

In some embodiments, a system and method are provided allowing a centralized artificial intelligence model management system to process encrypted representations of private client data in order to generate one or more distributed models. In particular, the model management system generates one or more distributed models that combine models (e.g., into an ensemble model) trained using the private client data without directly accessing the underlying private data. Rather than directly access the private data, the model management system obtains encrypted representations of private data values annotated at the client systems. Annotations of classified private data values by the client systems can include indications that a classification label for the private data value is correct or incorrect, and if incorrect, can include a corrected classification label. The encrypted representations of private data values can be encrypted by an encryption layer shared by one or more client systems. The model management system clusters encrypted private data values received from client systems with public data values or encrypted private data values received from other client systems. Using the clustering, the model management system combines encrypted representations of models remotely trained by the client systems using the private data values into one or more distributed models. After generating the one or more distributed models, the model management system provides some or all of the client systems access to the one or more distributed models. As such, the model management system can generate and improve distributed models using private data of distributed client systems without accessing the underlying data, thus maintaining data privacy for the client systems. Furthermore, by making the distributed models accessible to some or all of the client systems that provided private data, the model management system enables the client systems to benefit from their combined private data.

In some embodiments, the model management system clusters encrypted private data that have been classified by one or more of the client systems 120 using a public model provided by the model management system. In this case, the model management system can cluster encrypted private data annotated by client systems with public data associated with public classification labels. The model management system can further instruct the client systems to remotely train a model using the private data with public classification labels corresponding to clusters including the private data (i.e., client models). The model management system can combine the remotely trained client models into one or more distributed models, such as one or more ensemble models.

In some embodiments, some or all of the client systems train private models using private training data. In this case, the model management system can cluster encrypted private training data of multiple client systems. The model management system can further use the clusters of encrypted private training data to combine encrypted representations of private client models corresponding to the clusters into one or more distributed models, such as one or more ensemble models.

Example System Environment

Figure 1:
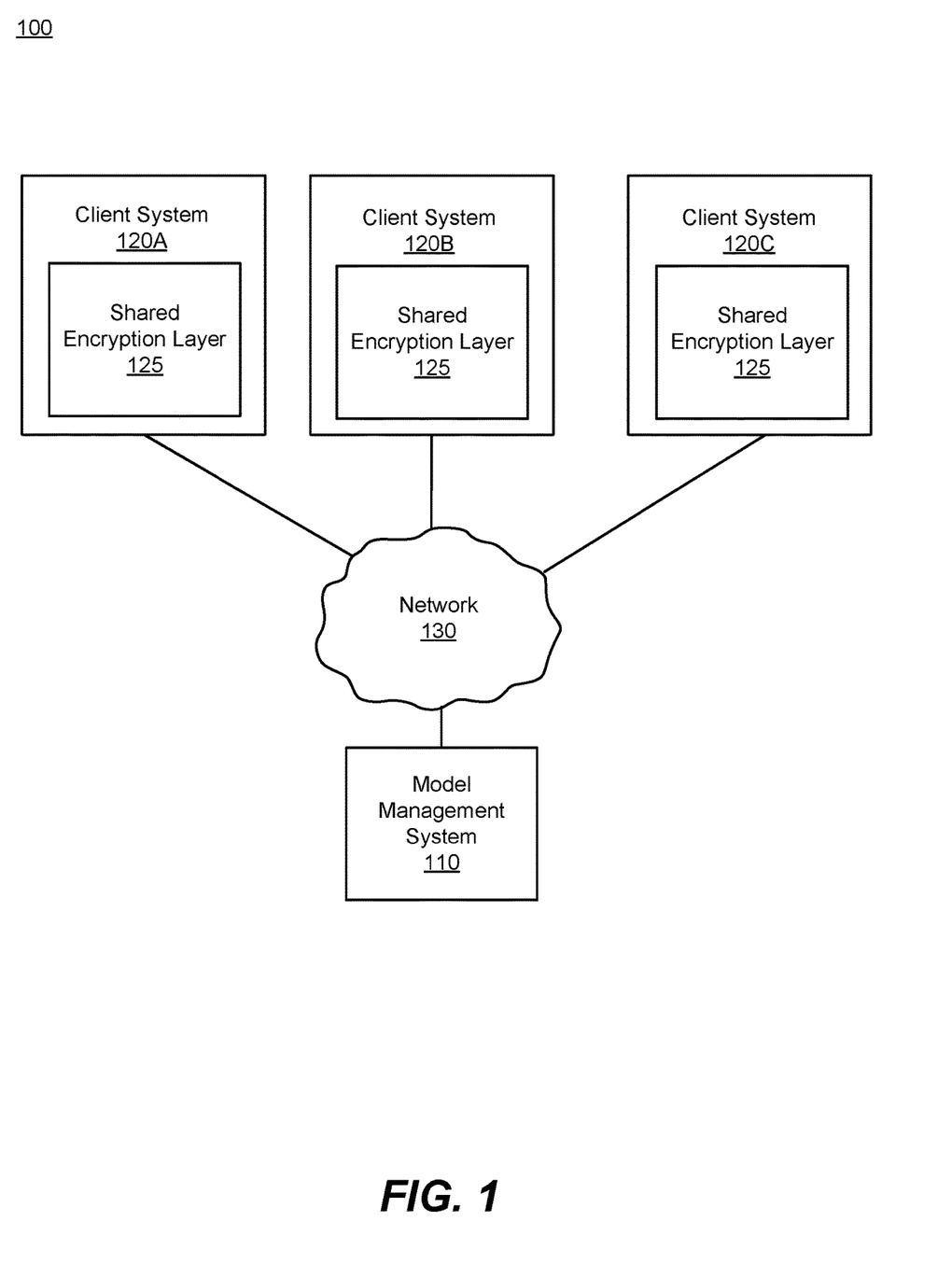

Figure (FIG. 1 illustrates one embodiment of a distribute computing environment 100 for a model management system 110. In the embodiment shown, the environment 100 includes a model management system 110, client systems 120, a shared encryption layer 125 on each of the client systems 120, and a network 140. In other embodiments, the computing environment 100 may include different or additional elements. Furthermore, the functionality may be distributed among the elements in a different manner than described. The elements of FIG. 1 may include one or more server computers that communicate via the network 140 or other suitable communication method.

The model management system 110 centrally manages training of machine learning models for a set of client systems 120 (e.g., the client systems 120A, 120B, 120C). In particular, the model management system 110 uses encrypted representations of private data values received from the client systems 120 to generate distributed models from one or more encrypted representations of models trained by the client systems 120. In doing so, the model management system 110 can continuously train and improve centrally managed distributed models based on crowd-sourced private data of the client systems 120 without accessing the underlying private data values. Encrypted representations of data and models are described in greater detail below with reference to the shared encryption layer 125. As used herein, the term private refers to information used by a client system 130 that is not accessible to the model management system 110 without authorization from the client system 130. In contrast, as used herein, the term public refers to information associated with the model management system 110 that is accessible to some or all of the client systems 120.

In embodiments, the model management system 110 monitors the client systems 120 to track annotations of private data values, such as by a process of the client systems 120 or administrators of the client systems 120. For instance, an administrator of the client system 120A may mark a classification label for a private data value as correct or incorrect, and if incorrect, may provide a corrected classification label for the private data value. In some embodiments, the annotations are applied to private data values of a client system 130 that have been classified by a classification model trained using public data values, such as a public classification model provided by the model management system 110. In the same or different embodiments, the annotations are applied to private training data used for training private classification models at client systems 120 (e.g., custom or third-party models trained by administrators of a client system 130). If an annotation is applied to a private data value, the model management system 110 can retrieve an encrypted representation of the private data value, which can also include an encrypted representation of annotation information for the private data value. For instance, the private data values can be encrypted by the shared encryption layer 125 prior to arriving at the model management system 110, which is discussed in greater detail below with reference to the shared encryption layer 125. The model management system 120 can cluster encrypted private data values from the client systems 120 with public data values or other encrypted private data values received from other client systems 120. For instance, the model management system 110 can generate clusters of encrypted private data values within a multi-dimensional space corresponding to the encrypted representation (e.g., an embedding vector space). Using the clusters of encrypted private data values, the model management system 110 can generate distributed models that have improved classification performance relative to private models trained by the individual client systems 120 or public models trained by the model management system 110. Techniques for generating distributed models, and in particular distributed ensemble models, are discussed in greater detail below with reference to FIGS. 2-5.

The client systems 120 (e.g., client systems 120A, 120B, and 120C) use machine learning models to process private data (e.g., classify the private data). In embodiments, the client systems 120 provide encrypted private data to the model management system 110 via the shared encryption layer 125 on each client system 120. In particular, the client systems 120 can associate annotation information with private data values and provide the encrypted private data values and annotation information to the model management system 110 via the shared encryption layer 125, as described above with reference to the model management system 110. The client systems 120 can use public models trained using public data to process their private data, such as a public model trained by the model management system 110. In this case, the client systems 120 may receive a local copy of the public model or access a remote instance of the public model. The client systems 120 can further train private models using private training data.

In some embodiments, the client systems 120 receive public data from the model management system 110 based on a comparison of encrypted private data provided by the client systems 120 to public data values at the model management system 110. The client systems 120 can then use the public data to train a private model, and provide an encrypted representation of the private model to the model management system 110 for generating a distributed model. Some of these embodiments are described in greater detail below with reference to FIG. 3. In the same or different embodiments, the client systems 120 can provide encrypted representations of private models trained using private data to the model management system 110 for generating one or more distributed models from the private models based on a clustering of encrypted private training data values for the client systems 120. Some of these embodiments are described in greater detail below with reference to FIG. 4. Although three client systems 120 are depicted in FIG. 1, the system environment 100 can include any number of client systems 120.

The shared encryption layer 125 on each of the client systems 120 generates encrypted representations of private data values or annotations of private data values provided by the client systems 120 to the model management system 110. In embodiments, the shared encryption layer 125 uses a homomorphic encryption technique to encrypt information received from the client systems 120 so that the encrypted information can be used to perform various processes (e.g., clustering encrypted private data values) without decrypting the information. In particular, the shared encryption layer receives private data values from a respective client system 120 (e.g., the client system 120A), encrypts the received private data values, and forwards the encrypted private data values to another system for processing, such as the model management system 110. The shared encryption layer 125 can further receive annotation information for the private data values from the respective client system 120. In this case, the shared encryption layer 125 can combine the private data values and the annotation information into a single encrypted representation, such as an encrypted vector. In the same or different embodiments, the shared encryption layer 125 receives or otherwise obtains models trained at a respective client system 120, generates an encrypted representation of the models, and forwards the encrypted models onto another system. The shared encryption layer 125 can further use received private data values or models for additional processes, such as training a public model at the shared encryption layer 125. The shared encryption layer 125 can further include a tokenization layer (e.g., an embedding layer) that converts the received private data values from an original representation (e.g., text, images, features, etc.) to a token representation (e.g., embedding vectors). In this case, the shared encryption layer 125 can encrypt the token representations of the private data values. In some embodiments, the shared encryption layer 125 is also a component of the model management system 110 and is used to encrypt public data values for comparison to encrypted private data values received from the client systems 120 through the network 140. Furthermore, the shared encryption layer 125 may be provided to each client system 120 by the model management system 110 (e.g., installed on the client system 130 by the model management system 110).

In an exemplary embodiment, the model management system 110 may be an electronic document-management system. In this case, the public and private data values used to train or generate the various models of the system environment 100 (e.g., public models, private models, distributed models, etc.) are document text values (e.g., words, sentences, etc.). Furthermore, the machine learning models managed by the model management system 110 can include text classification models that are used to classify the document text values. Further, the public and private data values used to train or generate the various models of the system environment 100 are text values (e.g., words, sentences, etc.) In this exemplary embodiment, the shared encryption layer 125 can further include one or more embedding layers (e.g., word embedding layers) which convert received public and private data values, or annotation information for the private data values, to corresponding embeddings. For instance, the shared encryption layer may use pre-trained word embeddings provided by a third-party system, such as Bidirectional Encoder Representations from Transformers (BERT) or Enhanced Language Representation with Informative Entities (ERNIE).

The models used by elements of the system environment 100 can employ various classification algorithms (i.e., classification models). These various classification algorithms can include neural networks (e.g., feed-forward neural networks, convolutional neural networks, recurrent neural networks, etc.), linear classifiers (e.g., logistic regression, Naïve Bayes, etc.), support vector machines, kernel estimation, decision trees, and any other appropriate classification technique. Furthermore, the classification models can use supervised learning techniques, unsupervised learning techniques, or some combination thereof. Although embodiments described herein use classification models, one skilled in the art will appreciate that the techniques described for generating distributed models using encrypted representations of private data can also be used for models associated with other machine learning tasks, such as reinforcement learning, dimensionality reduction, clustering, or regression.

The network 140 connects the client devices 130 to the central model management system 110 and the shared encryption layer 125. The network 140 may be any suitable communications network for data transmission. In an embodiment such as that illustrated in FIG. 1, the network 140 uses standard communications technologies or protocols and can include the internet. In another embodiment, the entities use custom or dedicated data communications technologies.

Example Model Management System

Figure 2:
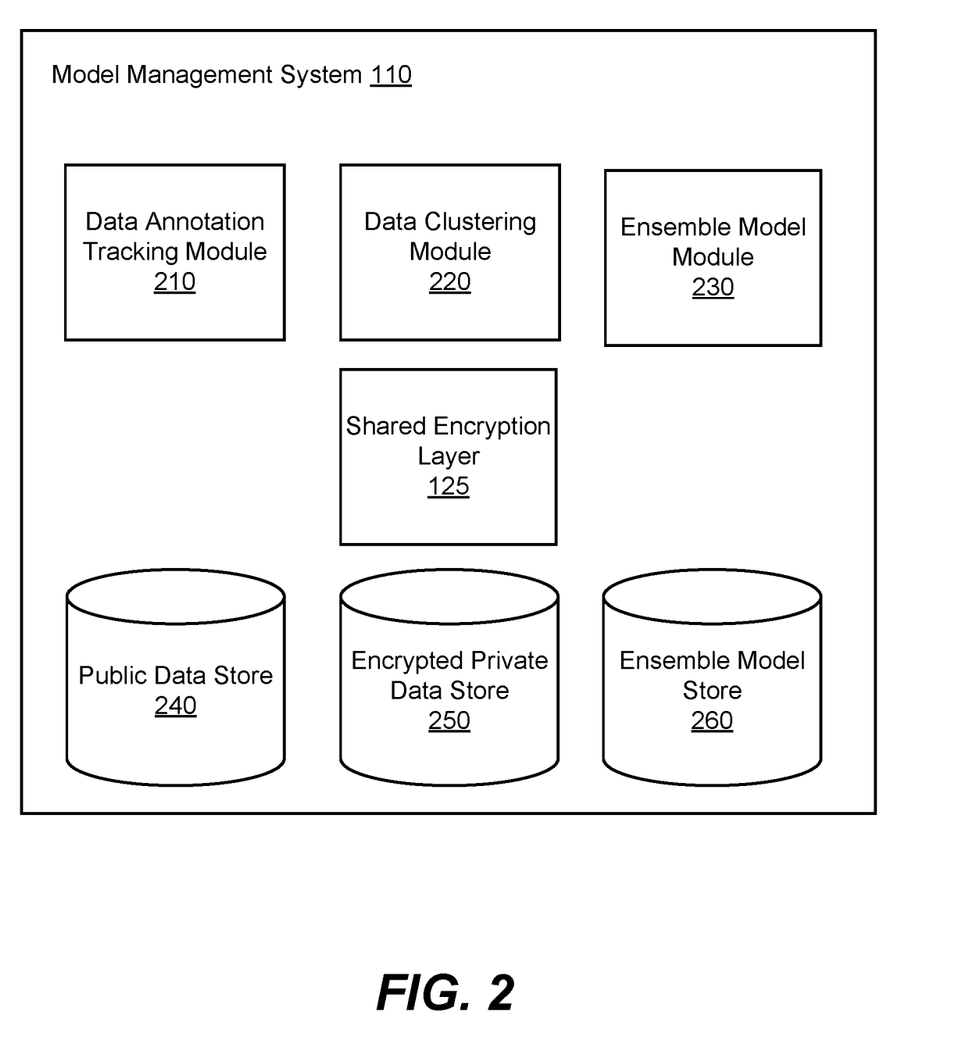
FIG. 2 is a block diagram illustrating one embodiment of the model management system, according to an embodiment.

FIG. 2 is a block diagram illustrating one embodiment of the model management system 110. In the embodiment shown, the model management system 110 includes a data annotation tracking module 210, a data clustering module 220, an ensemble model module 230, the shared encryption layer 125, a public data store 240, an encrypted private data store 250, and an ensemble model store 260. In other embodiments, there may be different or additional components than those shown in FIG. 2. Furthermore, some or all of the operations described for the below may be performed by another suitable device (e.g., one of the client systems 120). The device may have an architecture that includes some or all of the components of a computing system as described with FIG. 6. Further the modules may be embodied in hardware (e.g., specialized application specific integrated circuits (ASICS), field programmable gate arrays (FPGA)) or software and/or firmware (e.g., stored on a non-transitory computer readable storage medium and executable by one or more processors (e.g., a central processing unit, tensor processor, controller)). The data stores may be structured on one or more storage devices and may be stored in file systems and/or databases.

The data annotation tracking module 210 monitors the client systems 120 for annotations to private data values. In embodiments, the data annotation tracking module 210 retrieves or otherwise obtains encrypted representations of private data values or annotation information for the private data values (e.g., encrypted embedding vectors) after identifying the annotation to the private data value. The data annotation tracking module 210 may continuously monitor the client systems 120 for annotations to private data values or may periodically query the client systems 120 to identify any previous annotations. In some cases, the data annotation tracking module 210 monitors client systems 120 for annotations to private data values classified using a public classification model provided by the model management system 110. For instance, the model management system 110 can train a public classification model using public data (e.g., a text classification model) and provide the public classification model to the client systems 120 to use for classifying their private data. In such cases, the public classification model can classify the private data values using public classification labels corresponding to the public data used to train the public classification model. As such, the data annotation tracking module 210 can identify annotations of the classified private data values indicating the public classification labels are correct or incorrect, and if incorrect, provide a corrected classification label (e.g., provided by an administrator of a client system 130). In additional cases, the data annotation tracking module 210 monitors client systems 120 for annotations to private training data values used to train a private classification model of the client systems 120. In these cases, the data annotation tracking module 210 can receive encrypted representations of the private training data values with their private classification labels. The data annotation tracking module 210 can further store encrypted representations of private data values, annotation information for private data values, or private models in the encrypted private data store 250.

The data clustering module 220 clusters public data values and encrypted private representations of data values received from the client systems 120 (e.g., stored in the encrypted private data store 250). In particular, the data clustering module 220 clusters encrypted private data values with similar data values (e.g., private data values or public data values) without accessing the underlying private data values. In embodiments, the data clustering module 220 generates clusters of encrypted private data values by clustering encrypted private data values with other encrypted private data values or public data values represented in a comparable format via encryption using the shared encryption layer 125 on the model management system 110. For instance, the data clustering module 220 may compare encrypted embeddings representing private or public data values (e.g., stored in the public data store 240) by determining a similarity value for the encrypted embeddings (e.g., a cosine similarity). In this case, the data clustering module 220 can cluster encrypted embeddings which have a similarity value above a threshold (e.g., above 0.95 cosine similarity). The data clustering module 220 can also use other comparison metrics to cluster encrypted representations of public and private data values. If the data clustering module 220 determines an encrypted private data value corresponds to a cluster of public data values, indicating the encrypted private data value is associated with a public classification model, the data clustering module 220 can assign the encrypted private data value with a public classification label corresponding to one or more public data values of the cluster. Alternatively, if the data clustering module 220 determines an encrypted private data value does not correspond to any clusters of public classification labels, indicating the encrypted private data value is associated with a private classification model (e.g., private training data values), the data clustering module 220 can cluster the encrypted private data value with other encrypted private values obtained from other client systems 120.

In some embodiments, the data clustering module 220 uses encrypted annotation information associated with the encrypted private data values to cluster the encrypted private data values. For instance, the data clustering module 220 can cluster combined encrypted representations of private data values and corresponding annotation information (e.g., as a single encrypted embedding vector). In some cases, the data clustering module 220 performs clustering in part by using encrypted annotation information for multiple private data values provided by a client system to verify whether annotations provided by the client system are consistent with classifications of public data values or annotations provided by other client systems 120. In particular, the data clustering module 220 can use positive or negative encrypted private data values received from a client system 130 (i.e., data values annotated as having a correct or incorrect classification labels, respectively) to verify whether encrypted private data values received from a given client system 130 are consistent with public data values or private data values received from other client systems 120. As an example, the data clustering module 220 may determine an encrypted positive training data value received from the client system 120A corresponds to a cluster of encrypted positive private training data values from other client systems 120 (e.g., is within the same embedding vector space). In order to verify consistency, the data clustering module 220 may compare negative training data values from the client system 120A and the other client systems 120 to determine whether the negative training data values also correspond to each other (e.g., are within the same embedding vector space). In this case, if the encrypted negative training data values do correspond, the data clustering module 220 adds the received encrypted positive training data value to the cluster. Conversely, if the encrypted negative training data values do not correspond, the data clustering module 220 does not add the received encrypted positive training data to the cluster or may take other actions (e.g., notifying the client system 130). Using similar techniques as described above for private training data values, the data clustering module 220 may additionally, or alternatively, determine if private data values classified by a public model that are annotated as incorrect by the client system 120A should be clustered with public data values using private data values annotated as correct by the client system 120A.

The data clustering module 220 can further use private data consistency verification techniques to prevent security attacks (e.g., a denial-of-service attack). For instance, a malicious client system 130 may provide inaccurate annotation information for encrypted representations of private data (e.g., annotated as incorrect when actually correct, etc.). Such inaccurate annotation information could result in inaccurate clustering of encrypted private data values if consistency verification techniques are not employed by the data clustering module 220. If inaccurate annotation information for encrypted private data values received from a client system 130 is identified by the data clustering module 220, the data clustering module 220 can take action to prevent the client system 130 from impacting the accuracy of clustering or distributed model generation by the model management system 110. For example, the data clustering module 220 can ignore encrypted data values received from the client system 130. As another example, the model management system 110 can designate the client system 130 as a security risk or otherwise prevent the client system 130 from interacting with the model management system 110.

The ensemble model module 230 generates distributed ensemble models using encrypted representations of classification models trained remotely by the client systems 120. In embodiments, the ensemble model module 230 obtains encrypted representations of classification models remotely trained by some or all of the client systems 120 based on the data value clusters generated by the data value cluster module 220. The ensemble model module 230 combines the encrypted classification models into new ensemble models or adds the encrypted classification models into existing ensemble models (e.g., stored in the ensemble model store 260). The ensemble model module 230 further makes generated ensemble models available to some or all of the client systems 120. The ensemble model module 230 may generate an ensemble model in response to one or more data value clusters including a threshold number of encrypted private data values (e.g., 10,000 data values). The ensemble model module 230 can store public ensembles models or cluster ensemble models in the ensemble model store 260. The ensemble model module 230 may continuously or periodically communicate with the data clustering module 220 in order to generate or update ensemble models. The ensemble model module 230 can further store ensemble models in the ensemble model store 260.

In some embodiments, the ensemble model module 230 identifies public classification labels for encrypted private data values clustered with public data values (i.e., cluster classification labels). As an example, the ensemble model module 230 may determine a cluster classification label based on a statistical evaluation of the public classification labels for public data values associated with a cluster, such as the most frequent public classification label. In this case, the ensemble model module 230 can issue a training command to the client system client system 120 that provided the encrypted private data value to remotely train a client classification model using the underlying private data value labeled with the determined cluster classification label. Furthermore, the ensemble model module 230 can periodically issue a training command to some or all of the client systems 120, such as client systems 120 that have provided annotations to private data values classified using the public classification model. The ensemble model module 230 can additionally, or alternatively, provide public data values (e.g., data values clustered with the encrypted private data value) labeled with the determined cluster classification label to the client system 130 to use for remotely training the client classification model. In this case, the model management system 130 can indicate to the client system 130 whether to use provided public data values as positive or negative training examples, depending on if corresponding encrypted private data values were annotated as correct or incorrect. After remotely training the client classification model, the client system 130 can provide an encrypted representation of the client classification model to the ensemble model module 230, which can combine remotely trained encrypted client classification models received from multiple client system 130 to generate a public ensemble model. In one embodiment, the ensemble model module 230 generates a single public ensemble model accessible to each of the client systems 120. As such, unlike conventional systems, the model management system 110 can improve a public classification model using crowdsourced classifications of encrypted private data by the public classification model without accessing the underlying private data values.

In some embodiments, the ensemble model module 230 issues a training command to a client system 130 to remotely train a client model based on an annotation to a private data value without clustering an encrypted representation of the private data value. For instance, the ensemble model 230 can instruct a client system 130 that annotated a classified private data value as correct or incorrect to remotely train a client model using the private data value as a positive or negative training example, respectively.

In the same or different embodiments, the ensemble model module 230 generates an individual ensemble model for clusters of encrypted private data values which do not correspond to clusters of public data values (i.e., cluster ensemble models). For instance, the ensemble model module 230 can receive or otherwise obtain encrypted private classification models from each of the client systems 120 trained using the encrypted private data values in a cluster of private data values. The ensemble model module can then combine the encrypted private classification models corresponding to the cluster of encrypted private data values into a cluster ensemble model and provide the cluster ensemble model to each of the client systems 120 that provided the encrypted private classification models. As such, unlike conventional systems, the model management system 110 can enable the client systems 120 to gain the combined training knowledge of similar private classification models on other client systems 120 without accessing the underlying private training data or private classification models of those client systems 120.

Example Ensemble Model Generation

Figure 3:
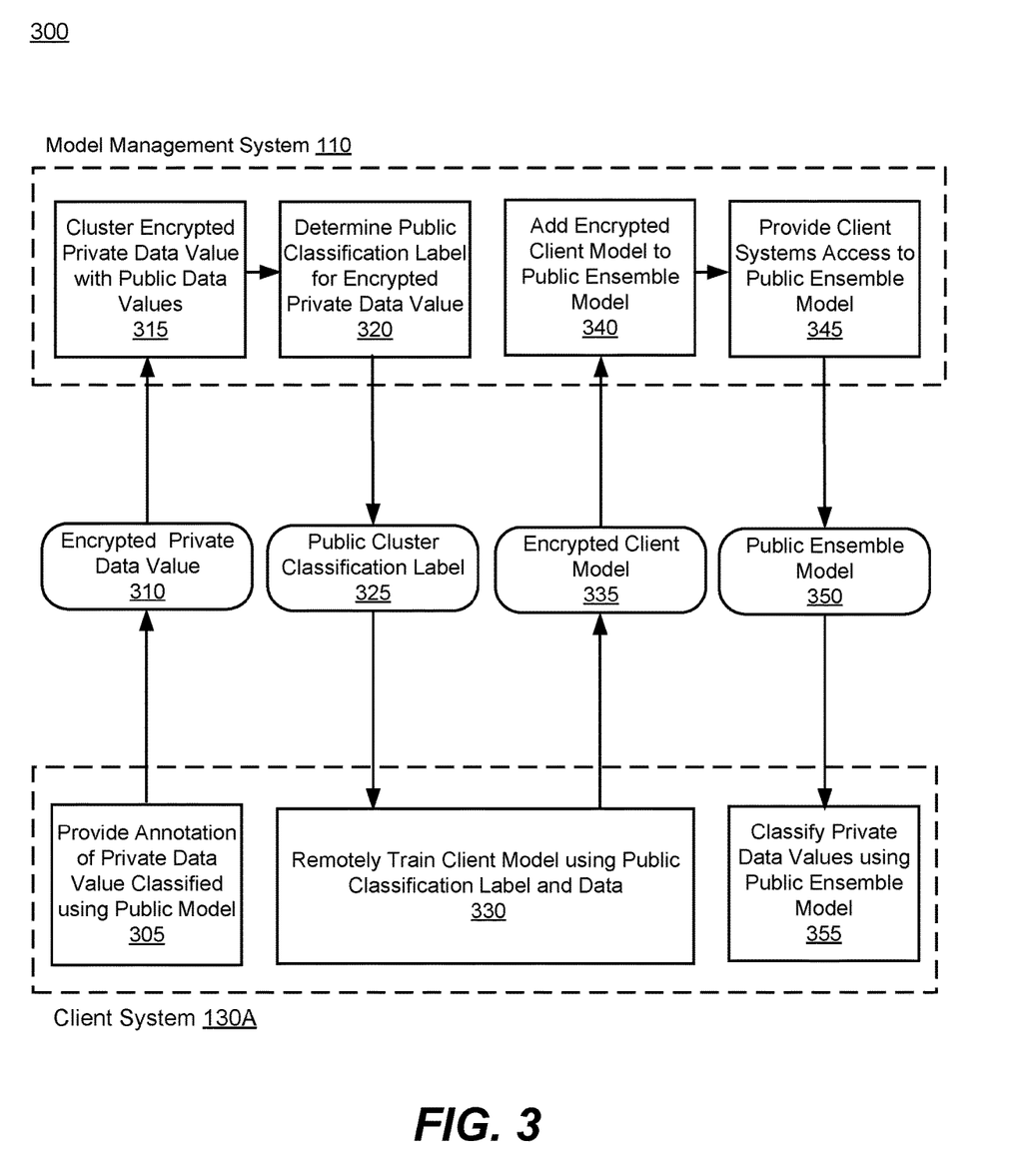
FIG. 3 is a flow diagram illustrating a process for generating an ensemble model using private data values of a client system classified using a public classification model, according to an embodiment.

FIG. 3 is a flow diagram illustrating one embodiment of a process 300 for generating an ensemble model using private data values of the client system 120A classified using a public classification model. In the example embodiment shown, the model management system 110 and a client system client system 120A are illustrated performing the steps of the process 300. However, some or all of the steps may be performed by other entities or components. In addition, some embodiments may perform the steps in parallel, perform the steps in different orders, or perform different steps.

In the embodiment of FIG. 3, the client system 120A uses a public classification model provided by the model management system 110 to classify private data values. The process 400 may begin with client system 120A providing 305 annotations to a private data value classified using the public classification model. For instance, an administrator of the client system 120A may mark a classification of a private data value by the public classification model as correct or incorrect. Based on the annotation of the private data value, the model management system 110 retrieves an encrypted representation of the private data value 310. For example, the private data value can be encrypted by the shared encryption layer 125 on the client system 120A. After receiving the encrypted private data value 310, the model management system 110 clusters 315 the encrypted private data value 310 with public data values, such as public data values represented in the same embedding vector space as the encrypted private data value 310. The public data values may be training data values used to train the public classification model, or they may be other public data values associated with the classification labels of the public classification model.

Based on the clustering 315, the model management system 110 determines 320 a public classification label for the encrypted private data value 310. For example, the model management system 110 can determine 320 a cluster of public data values associated with one or more public classification labels corresponding to the encrypted private data value 310. In this case, the model management system 110 can select a public cluster classification label 325 from the one or more public classification labels associated with the cluster of public data values. The model management system 110 provides the public cluster classification label 325 to the client system 120A to use for remotely training 330 a client model. For example, the model management system 110 can issue a remote training command to some or all of the client systems 120 to train a client model based on the one or more public cluster classification labels determined for encrypted private data values. The model management system 110 can additionally, or alternatively, provide the public data values in the cluster associated with the public cluster classification label 325, or other data values associated with the public cluster classification label 325, to use for training the client model. The model management system 110 can further instruct the client system 120A to use the provided public data values as either positive or negative training examples, as appropriate.

After training the client model, the client system 120A provides an encrypted representation of the client model 335 to the model management system 110. For example, the client model can be encrypted by the shared encryption layer 125 on the client system 120A. The model management system adds 340 the encrypted client model 335 to a public ensemble model 350. For instance, the model management system 110 can combine encrypted client models received from each of the client systems 120 that remotely trained a client model to generate the public ensemble model 350. Furthermore, the model management system 110 can continuously update the public ensemble model 350 as new encrypted client models are remotely trained by the client systems 120. After adding 340 the encrypted client model to the public ensemble model 350, the model management system 110 provides 345 the client systems 120 access to the public ensemble model 350. The client system 120A uses the public ensemble model 350 to classify 355 private data values. In some embodiments, the public ensemble model 350 includes the public classification model provided by the model management system 110 and used to classify the private data value.

In some embodiments, the client system 120A provides 305 annotations to the private data value that include a private classification label to replace a public classification label used by the public classification model. For example, an administrator of the client system 120A may mark a classification of the private data value by the public classification model as correct, but additionally provide a private classification label that is distinct from the correct classification label. In this case, the model management system 110 can cluster the encrypted private data value 310 with encrypted private data values from other client systems 120 that are also classified by the public model but annotated with an encrypted private classification label. The client system 120A can determine a public or private cluster classification label for the clustered encrypted private data values, such as by selecting the most common encrypted private classification label used by client systems 120 to replace a corresponding public classification label. As with the public cluster classification label 325, the model management system 110 can provide the determined public or private cluster classification label to the client system 120A. The steps 330, 340, 345, and 355 can be performed using the provided public or private classification label, as described above.

Example Ensemble Model Generation

Figure 4:
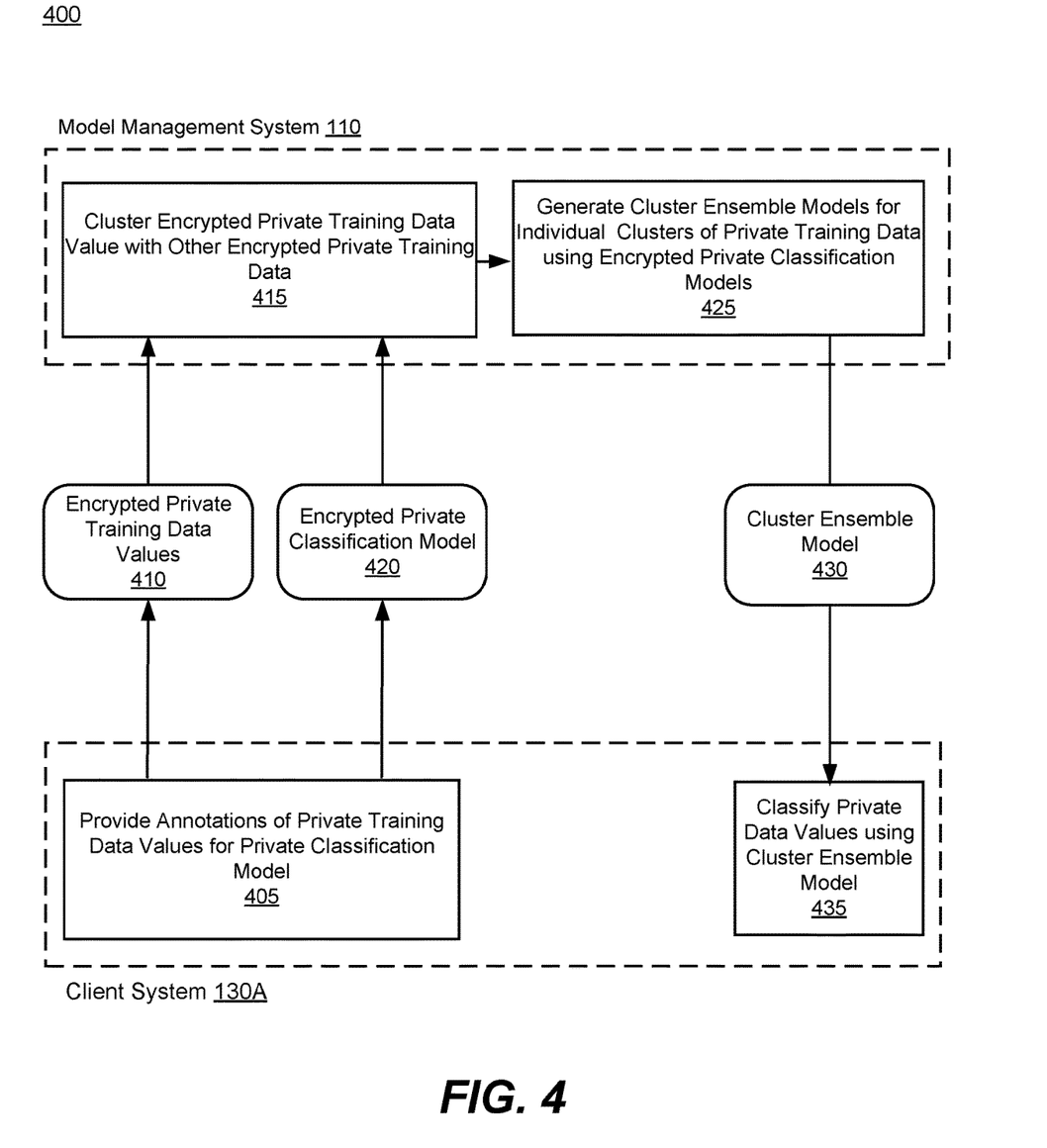
FIG. 4 is a flow diagram illustrating a process for generating an ensemble model using private training data values of a client system, according to an embodiment.

FIG. 4 is a flow diagram illustrating one embodiment of a process 400 for generating an ensemble model using private training data values of the client system 120A. In the example embodiment, the model management system 110 and a client system 120A are illustrated performing the steps of the process 400. However, some or all of the steps may be performed by other entities or components. In addition, some embodiments may perform the steps in parallel, perform the steps in different orders, or perform different steps.

In the embodiment of FIG. 4, the client system 120A trains a private classification model using private training data values. As an example, the client system 120A may use a custom model implemented by administrators of the client system 120A or trained using private data collected by administrators of the client system 120A. The process 400 may begin with the client system 120A providing 405 annotations of the private training data values used to train the private classification model. In particular, the annotations of the private training data values include private training classification labels, such as private classification labels provided by administrators of the client system 120A or obtained from a third-party. The private training classification labels of the private training values may be positive training examples (i.e., correct) classification labels or negative training examples (i.e., incorrect).

Based on the annotations of the private training data values, the model management system 110 retrieves an encrypted representation of the private training data values 410. For example, the private data value can be encrypted by the shared encryption layer 125 on the client system 120A. The encrypted private training data values 410 include the private training classification labels. After receiving the encrypted private training data values 410, the model management system 110 clusters 415 the encrypted private training data values 410 with other encrypted private training data values. For example, the model management system 110 may determine the encrypted private training data values 410 do not correspond to a cluster of public data values. In this case, the model management system 110 can compare the encrypted private training data values 410 to encrypted private training data values received from other client system 130 to cluster the various encrypted private training data values.

In addition to the encrypted private training data values 410, the model management system 110 retrieves an encrypted representation of the private classification model 420 trained using the private training data values. In some cases, the model management system 110 retrieves the encrypted private classification model 420 after the clustering 415, such as in response to the clusters associated with the encrypted private training data values exceeding a threshold number of encrypted private data values.

After clustering 415 the encrypted private training data values 410, the model management system 110 generates 425 cluster ensemble models. In particular, the model management system 110 adds the encrypted private classification model 420 to a cluster ensemble model 430 including one or more other encrypted private classification models corresponding to encrypted private training data values clustered with the encrypted private training data values 410. After generating 425 the cluster ensemble models, the model management system 110 provides the client systems 120 access to the cluster ensemble model 430. The client system 120A uses the cluster ensemble model 430 to classify 435 private data values.

Figure 5:
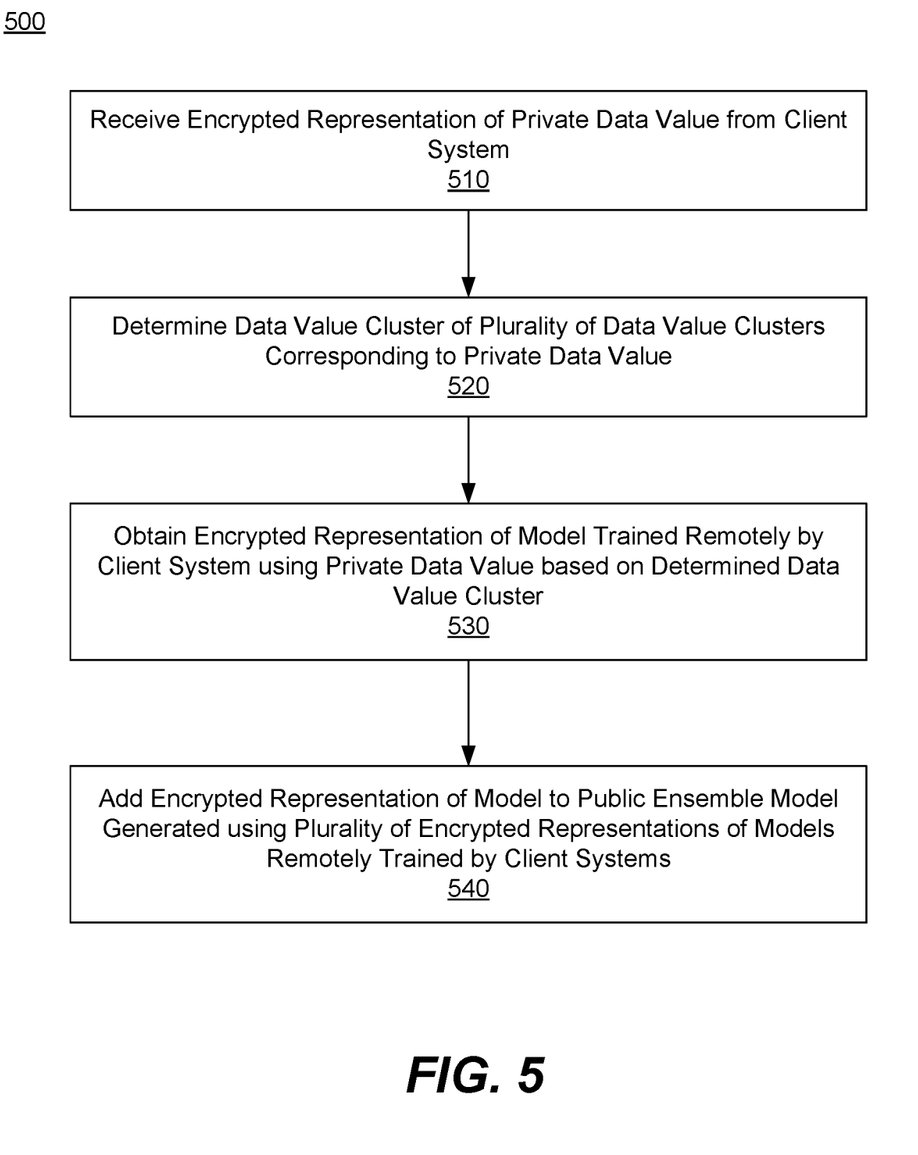
FIG. 5 is a flow diagram illustrating a process for remotely training a public ensemble model of a model management system, according to an embodiment.

FIG. 5 is a flow diagram illustrating one embodiment of a process 500 for remotely training a public ensemble model of the model management system 110, according to one embodiment. In the example embodiment shown, the model management system 110 performs the steps of the process 500. For example, the steps of process 500 may be performed by appropriate modules depicted in FIG. 2 and described above. However, some or all of the steps may be performed by other entities or components. In addition, some embodiments may perform the steps in parallel, perform the steps in different orders, or perform different steps.

In the embodiment of FIG. 5, the model management system 110 receives 510 an encrypted representation of a private data value from a client system. In particular, the encrypted representation incudes annotation information for the private data value provided by the client system. For example, the data annotation tracking module 210 may identify an annotation to a private data value on the client system 130A and obtain the encrypted representation of the private data value from the client system 130A. Using the encrypted representation, the model management system 110 determines 520 a data value cluster of a plurality of data value clusters corresponding to the private data value. The plurality of data value clusters is generated by the model management system 110 using encrypted representations of a plurality of private data values provided by a plurality of client systems (e.g. generated by the data clustering module 220). For instance, the data clustering module 220 may determine the encrypted representation corresponds to a cluster of public data values associated with a public classification label (e.g., as depicted in FIG. 3), or may determine the encrypted representation corresponds to a cluster of other encrypted private data values (e.g., as depicted in FIG. 4). Based on the determined data value cluster, the model management system 110 obtains 530 an encrypted representation of a model trained remotely by the client system using the private data value. As an example, if the determined data value cluster include public data values, the ensemble model module 230 may identify a public classification label associated with the determined data value cluster and issue a remote training command to the client system to train a new client model locally using the private data value and the public classification label (e.g., as depicted in FIG. 3). As another example, if the determined data value cluster includes encrypted private training data values, the ensemble model module 230 may obtain an encrypted private model from the client system trained using the private data value (e.g., as depicted in FIG. 4). The model management system 110 adds 540 the encrypted representation of the model to a public ensemble model generated by the model management system 110 using a plurality of encrypted representation of models remotely trained by the plurality of client systems. For instance, the ensemble model module 230 may add the encrypted representation of the model to a public ensemble (e.g., as depicted in FIG. 3) or a cluster ensemble model (e.g., as depicted in FIG. 4), as appropriate.

As such, through the process 500 or other processes described herein, the model management system 110 provides a technical improvement relative to existing systems by training distributed models using private data crowdsourced from the client systems 120 without accessing the underlying private data. In doing so, the model management system 110 can continuously improve and adapt the distributed models as new annotation information for private data values is received from the client systems 120 without compromising data privacy for the client systems 120.

Computing Machine Architecture

Figure 6:
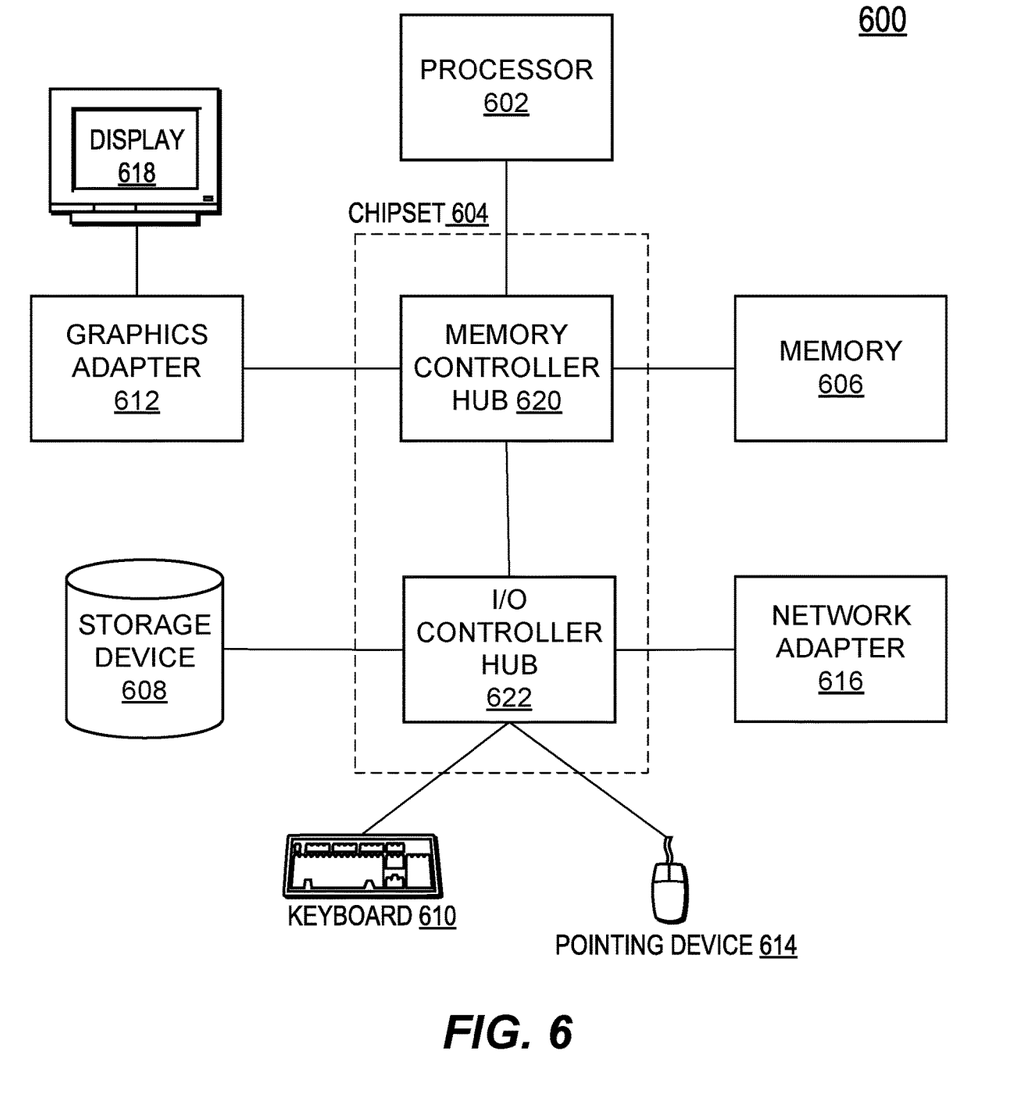
FIG. 6 illustrates components of an example machine able to read instructions from a machine-readable medium and execute them in a processor (or controller).

Turning now to FIG. 6, it is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., as software or program code) for causing the machine to perform (execute) any one or more of the methodologies described with FIGS. 1-5. That is, the methodologies illustrated and described through FIGS. 1-5 can be embodied as instructions 624 that are stored and executable by the computer system 600. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a tensor processor, a digital signal processor (DSP), one or more application specific integrated circuits (ASICs), one or more radio-frequency integrated circuits (RFICs), or any combination of these), a main memory 604, and a static memory 566, which are configured to communicate with each other via a bus 608. The processing components are the processor 602 and memory 604. These components can be configured to operate the engines or modules with the instructions that correspond with the functionality of the respective engines or modules. The computer system 500 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The storage unit 616 may be implemented as volatile memory (static RAM (SRAM) or dynamic RAM (DRAM)) and/or non-volatile memory (read-only memory (ROM), flash memory, magnetic computer storage devices (e.g., hard disks, floppy discs and magnetic tape), optical discs and etc.). The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONFIGURATION CONSIDERATIONS

It is noted that although the configurations as disclosed are in the context of training models for clause identification, the principles disclosed can apply to the generation and training of other types of models using data from a plurality of different parties. Advantages of the disclosed configurations may include the ability of each party to provide information for generating and training the model, allowing the model to be able to be trained using a more diverse set of information, with each party having the ability to tracking where their submitted information is used, and to remove their information from the model. Moreover, while the examples herein are in the context of clause identification for a contract document, the principles described herein can apply to other documents, for example web pages, having various clauses.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of software components, engines, modules, or mechanisms, for example, as illustrated and described with in the figures. For example, the processes described in FIGS. 1-5 maybe embodied as software stored by and/or executed by a computing system as in FIG. 6. Continuing with the example, modules may constitute either software modules (e.g., program code embodied as instructions 624 stored on a machine-readable medium e.g., memory 604 and/or storage unit 616, and executable by one or more processors (e.g., processor 602)) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a one or more processors (generally, e.g., processor 602)) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 604). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for managing and tracking information for generating and training models through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for remotely training a public ensemble model of an artificial intelligence model management system, the method comprising:
   receiving, by the model management system, an encrypted representation of a private data value from a client system of a plurality of client systems, the encrypted representation including annotation information provided by the client system encrypted using a homomorphic encryption technique;
   determining, using the encrypted representation a data value cluster of a plurality of data value clusters corresponding to the private data value, the plurality of data value clusters generated using encrypted representations of a plurality of private data values provided by the plurality of client systems;
   obtaining, based on the determined data value cluster, an encrypted representation of a model, the model trained remotely by the client system using the private data value; and
   adding the encrypted representation of the model to the public ensemble model, the public ensemble model generated using a plurality of encrypted representations of models remotely trained by the plurality of client systems.

2. The computer-implemented method of claim 1, wherein the data value cluster includes one or more public data values, and wherein obtaining the encrypted representation of the model comprises:
   determining, based on classification labels corresponding to the one or more public data values of the data value cluster, a public classification label for the encrypted private data value; and
   providing, by the model management system, the public classification label to the client system to use for remotely training the model.

3. The computer-implemented method of claim of claim 2, further comprising:
   providing a plurality of public data values associated with the data value cluster to the client system to use for remotely training the model.

4. The computer-implemented method of claim 1, wherein the data value cluster includes a plurality of encrypted representations of private data values received from other client systems, and wherein obtaining the encrypted representation of the model comprises:
   obtaining, by the model management system, a plurality of encrypted representations of private models remotely trained by the client system and the other client systems, the private models including the model; and generating the public ensemble model using the plurality of encrypted representations of private models.

5. The computer-implemented method of claim 1, wherein determining the data value cluster corresponding to the private data value comprises:

determining, for the encrypted private data value and annotation information, a similarity value to each of the plurality of data value clusters; and responsive to the similarity value for the data value cluster being above a similarity value threshold, assigning the private data value to the data value cluster.

6. The computer-implemented method of claim 1, wherein determining the data value cluster corresponding to the private data value comprises:

determining the private data value does not correspond to any data value clusters of the plurality of data value clusters including one or more public data; and responsive to determining the private data value does not correspond to any data value clusters of the plurality of data value clusters, generating a cluster of encrypted private data values received from one or more client systems of the plurality of client systems.

7. The computer-implemented method of claim 1, wherein receiving the encrypted representation of the private data value further comprises:

monitoring, by the model management system, the plurality of client systems for annotations to a plurality of private data values;

obtaining, responsive to identifying, based on the monitoring, an annotation of a private data value, the encrypted representation of the private data value.

8. The computer-implemented method of claim 1, further comprising:

receiving, by the model management system, a plurality of encrypted representations of private data values from an additional client system of the plurality of client systems, the plurality of encrypted representations including respective annotation information;

determining, using the plurality of encrypted representations, whether the respective annotation information is consistent with other annotation information provided by other client systems of the plurality of client systems; and identifying, responsive to determining the respective annotation information is not consistent, the additional client system as a security risk.

9. The computer-implemented method of claim 1, wherein the annotation information includes an encrypted representation of a correction to a classification label for the private data value determined using a public model associated with the model management system.

10. The computer-implemented method of claim 9, wherein the encrypted representation of the private data value and annotation information is an embedding vector generated using an embeddings model shared by the plurality of client systems.

11. A non-transitory computer readable storage medium comprising stored instructions to train a public ensemble model of an artificial intelligence model management system, the instructions when executed cause at least one processor to:

receive, by the model management system, an encrypted representation of a private data value from a client system of a plurality of client systems, the encrypted representation including annotation information for the private data value provided by the client system encrypted using a homomorphic encryption technique;

determine, using the encrypted representation, a data value cluster of a plurality of data value clusters corresponding to the private data value, the plurality of data value clusters generated using encrypted representations of a plurality of private data values provided by the plurality of client systems;

obtain, based on the determined data value cluster, an encrypted representation of a model, the model trained remotely by the client system using the private data value;

and add the encrypted representation of the model to the public ensemble model, the public ensemble model generated using a plurality of encrypted representations of models remotely trained by the plurality of client systems.

12. The non-transitory computer readable storage medium of claim 11, wherein the data value cluster includes one or more public data values, and wherein the instructions to obtain the encrypted representation of the model further comprises instructions that when executed causes the at least one processor to:

determine, based on classification labels corresponding to the one or more public data values of the data value cluster, a public classification label for the encrypted private data value; and provide, by the model management system, the public classification label to the client system to use for remotely training the model.

13. The non-transitory computer readable storage medium of claim 12, further comprising stored instructions that when executed causes the at least one processor to:

provide a plurality of public data values associated with the data value cluster to the client system to use for remotely training the model.

14. The non-transitory computer readable storage medium of claim 11, wherein the data value cluster includes a plurality of encrypted representations of private data values received from other client systems, and wherein the instructions to obtain the encrypted representation of the model further comprises instructions that when executed causes the at least one processor to:

obtain, by the model management system, a plurality of encrypted representations of private models remotely trained by the client system and the other client systems, the private models including the model; and generate the public ensemble model using the plurality of encrypted representations of private models.

15. The non-transitory computer readable storage medium of claim 11, wherein the instructions to determine the data value cluster corresponding to the private data value further comprises instructions that when executed causes the at least one processor to:

determine, for the encrypted private data value and annotation information, a similarity value to each of the plurality of data value clusters; and assign, in response to the similarity value for the data value cluster being above a similarity value threshold, the private data value to the data value cluster.

16. The non-transitory computer readable storage medium of claim 11, wherein the instructions to determine the data value cluster corresponding to the private data value further comprising instructions that when executed causes the at least one processor to:

determine the private data value does not correspond to any data value clusters of the plurality of data value clusters including one or more public data; and generate, in response to execution of the instructions to determine the private data value does not correspond to any data value clusters of the plurality of data value clusters, a cluster of encrypted private data values received from one or more client systems of the plurality of client systems.

17. The non-transitory computer readable storage medium of claim 11, wherein instructions to receive the encrypted representation of the private data value further comprises stored instructions that when executed causes the at least one processor to:

monitor, by the model management system, the plurality of client systems for annotations to a plurality of private data values;

obtain, in response to execution of the instructions to identify and to monitor, an annotation of a private data value, the encrypted representation of the private data value.

18. The non-transitory computer readable storage medium of claim 11, further comprising stored instructions that when executed causes the at least one processor to:

receive, by the model management system, a plurality of encrypted representations of private data values from an additional client system of the plurality of client systems, the plurality of encrypted representations including respective annotation information;

determine, using the plurality of encrypted representations, whether the respective annotation information is consistent with other annotation information provided by other client systems of the plurality of client systems; and identify, responsive to determining the respective annotation information is not consistent, the additional client system as a security risk.

19. The computer-implemented method of claim 11, wherein the annotation information includes an encrypted representation of a correction to a classification label for the private data value determined using a public model associated with the model management system.

20. The computer-implemented method of claim 19, wherein the encrypted representation of the private data value and annotation information is an embedding vector generated using an embeddings model shared by the plurality of client systems.

21. A model management system comprising:

circuitry; and a memory coupled to the circuitry, the memory storing instructions that when executed by the circuitry cause the circuitry to:

receive, by the model management system, an encrypted representation of a private data value from a client system of a plurality of client systems, the encrypted representation including annotation information provided by the client system encrypted using a homomorphic encryption technique;

determine, using the encrypted representation a data value cluster of a plurality of data value clusters corresponding to the private data value, the plurality of data value clusters generated using encrypted representations of a plurality of private data values provided by the plurality of client systems;

obtain, based on the determined data value cluster, an encrypted representation of a model, the model trained remotely by the client system using the private data value; and add the encrypted representation of the model to the public ensemble model, the public ensemble model generated using a plurality of encrypted representations of models remotely trained by the plurality of client systems.

* * * * *